United States Patent Office 3,552,975
Patented Jan. 5, 1971

3,552,975
HOP FLAVORS FOR MALT BEVERAGES
AND THE LIKE
Leonard R. Worden and Paul H. Todd, Jr., Kalamazoo, Mich., assignors to Kalamazoo Spice Extraction Company, Kalamazoo, Mich., a corporation of Michigan
No Drawing. Continuation-in-part of application Ser. No. 436,271, Mar. 1, 1965. This application June 11, 1969, Ser. No. 832,449
Int. Cl. C07c *49/58;* C12c *9/02*
U.S. Cl. 99—50.5                                       8 Claims

ABSTRACT OF THE DISCLOSURE

Process for producing 4-deoxytetrahydrohumulone from lupulone by hydrogenolysis thereof after downward adjustment of pH into the acid range, optional subsequent oxygenation to tetrahydrohumulone, and optional isomerization and reduction to produce hexahydroisohumulone; hexahydroisohumulone itself; use of hexahydroisohumulone, in beverage flavoring; beverages flavored therewith; and employment of the portion of the non-volatile nonisomerizable hop extract fraction which dissolves in water at a pH of at least 9 as starting material in the first-mentioned production processes; use of tetrahydroisohumulone in beverage flavoring, especially by isomerizing tetrahydrohumulone in the beverage; beverages and especially malt beverages so flavored.

---

This application is a continuation-in-part of application Ser. No. 436,271, filed Mar. 1, 1965, now abandoned.

The present invention relates to hop flavors for malt beverages and the like, production thereof, and utilization thereof in the flavoring of beverages, and is especially concerned with the production of certain novel hop flavor compositions and the production and use thereof as well as improvements in the process of producing certain known hop flavor compositions and intermediates in the preparation thereof.

In the production of isohumulone from hops by extraction thereof, as practiced by the more progressive segments of the brewing industry today, lupulone is produced as a by-product which is ordinarily discarded. The present invention provides a novel and significant way to utilize this byproduct in the production of other valuable hop flavor compositions, some of which are themselves novel and of improved stability when used in the flavoring of beverages, e.g., malt beverages such as beer or ale, such stability including light stability, the beverage product flavored therewith thus being completely light-stable and "skunkproof."

It is accordingly an object of the present invention to provide a novel process for the production of 4-deoxytetrahydrohumulone from lupulone, and a further novel and improved three-step process for production of tetrahydroisohumulone from lupulone. An additional object is to provide a novel process for producing hexahydroisohumulone from tetrahydroisohumulone and also in a four-step process starting from luplone. Another object is the provision of hexahydrisohumulone, which is a completely stable hop flavor useful in flavoring of beverages, especially malt beverages such as beer and ale. A further object is to provide a hydrogenolyzed oxidized modified nonvolatile nonisomerizable (NVNI) fraction from the extraction of hops (mainly tetrahydrohumulone) which is itself useful in the flavoring of beverages in view of the fact that it isomerizes in the beverage to produce tetrahydroisohumulone. The use in beverage flavoring of tetrahydroisohumulone, and beverages flavored therewith, is a further object of the invention. Additional objects will become apparent hereinafter and still other objects will be apparent to those skilled in the art.

The sequence of reactions and products is illustrated more fully in Chart A following, in which the formulas given stand for more than a single chemical entity or molecular structure. When R in structure I is

—CH$_2$—CH(CH$_3$)$_2$ the compound is called lupulone, when R is is

—CH(CH$_3$)—CH$_2$CH$_3$ the compound is named adlupulone, and when R is —CH(CH$_3$)$_2$, the compound is named colupulone, and so on for the remaining compounds illustrated. The compounds generally exist in admixture. Moreover, Compounds III–V have asymmetric carbon atoms, and optical isomers are therefore included, as well as mixtures of stereoisomers where such exist (as in Compounds IV and V).

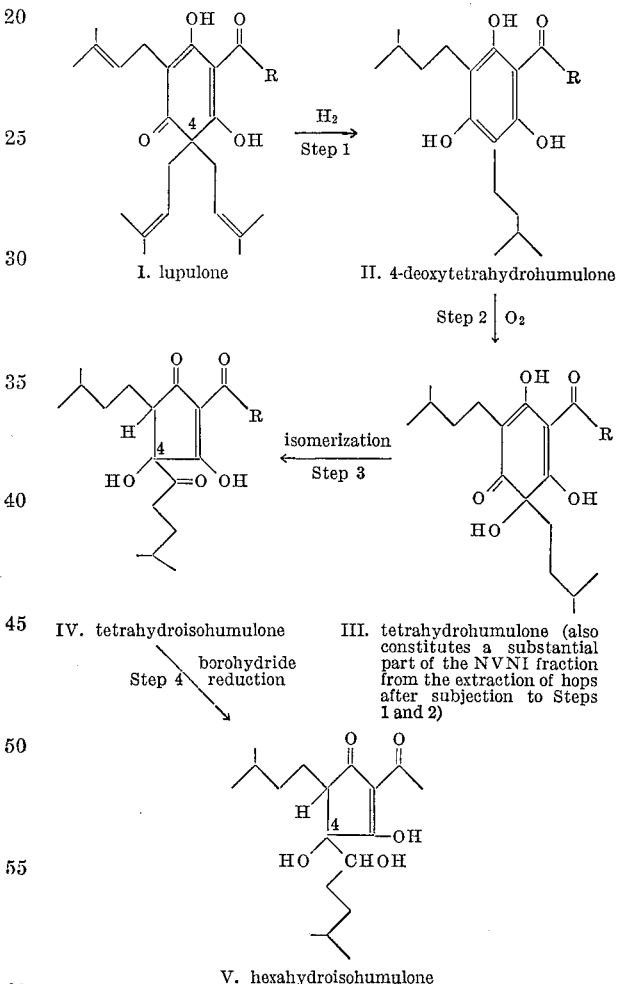

I. lupulone
II. 4-deoxytetrahydrohumulone
III. tetrahydrohumulone (also constitutes a substantial part of the NVNI fraction from the extraction of hops after subjection to Steps 1 and 2)
IV. tetrahydroisohumulone
V. hexahydroisohumulone As background and for purposes of clarification, an abbreviated version of the hop extraction process now follows. The ground hops are extracted with a solvent or solvent mixture such as a hydrocarbon, e.g., benzene, hexane, heptane, or the like. The solvent is fractionally distilled to provide recovered solvent and some of the volatile (hop essential oil) portion of the extract. The undistilled material (micella) is heated in a basic aqueous medium. The remainder of the volatile (hop essential oil) fraction steam distills and is isolated during this operation. The hot, basic medium causes isomerization of everything which will isomerize, including the alpha-acids or reduced and/or hydrogenated derivatives thereof which convert to the iso form. The isomerized product is more acidic than its precursor. The pH of the cooled, isomerized reaction mixture is lowered from 10–11 to 7–8 at which point the aqueous solution containing isomerized material (including much isohumulone) is separated from black tars (nonvolatile, nonisomerizable—"NVNI"—materials). From now on this crude, nonvolatile and nonisomerizable tar will be referred to as the NVNI fraction. Of course, "nonvolatile" and "nonisomerizable" are relative terms and as used herein are used only with reference to the conditions to which the hop extract is subjected for this determination, namely: a hot basic aqueous medium of pH 10–11.

The NVNI fraction is then stirred with water at a pH of at least 9, for example, 11–12. This gives an aqueous solution containing crude (ca. 70%) lupulone and black tars. The tars are discarded, and the aqueous solution is worked up to provide crude lupulone. This fraction will sometimes hereinafter be referred to as crude lupulone.

Either crude lupulone or pure lupulone may be used as starting material in the process. To obtain pure II and III (tetrahydrohumulone), of course, a pure starting material is preferred. Conversely, to obtain the useful hydrogenolyzed, oxidized NVNI fraction (containing considerable III), it is necessary to start with the NVNI fraction which is water-soluble at pH of at least 9, e.g., the crude lupulone as above-defined, or in the form of the unpurified or unwashed NVNI fraction. The preparation of this product is illustrated in Example 5.

(I→II)

Step 1 of the process has been reported in the literature. However, yields have been low and the product impure, even when pure lupulone was employed as starting material. In contrast, in the present process, yields of the desired 4-deoxytetrahydrohumulone (II) are nearly quantitative when starting from pure lupulone and relatively high even when crude lupulone (the pH >9 water-soluble segment of the NVNI fraction) is employed as starting material. The improvement in this step of the process is based on the discovery that the hydrogenolysis is very sensitive to pH and that conditions used by prior investigators gave poor yields and impure product. In contrast, when the hydrogenolysis is conducted under acid conditions, especially at a pH of 5 or less, the yield is nearly quantitative as already stated. Best results are obtained at a pH of 1 or below.

The solvent for this step is not critical. Methanol is preferred, but other alcohols and aqueous alcohols may be substituted for methanol, as well as dioxane or ethyl ether. The volume of solvent is not critical. Although palladium on carbon is the preferred catalyst, other hydrogenation catalysts and other supports may be used. Platinum, palladium, and rhodium, and palladous chloride, are representative catalysts. Rhodium on alumina may be employed. The catalyst may be used alone without support if desired. Concentrations of catalyst to support when used may vary widely but usually do not exceed 10%. Five percent is preferred. The quantity of catalyst is not critical. If less catalyst is used, the reaction proceeds more slowly. The temperature and pressure may also be varied widely from about room temperature to high temperatures and from about atmospheric pressure to pressures up to about 60 p.s.i. as in a Parr apparatus or even higher. When the reaction is complete, the reaction product may be separated from catalyst, partitioned between water and solvent, e.g., diethyl ether, the solvent layer washed, dried, and reduced in volume by evaporation to produce the desired 4-deoxytetrahydrohumulone (II).

(II→III)

Step 2 of the process is a conventional lead (II) acetate oxidation. The solvent is not critical. Besides methanol, ethanol, aqueous methanol or ethanol, and other solvents may also be used. Oxygen is essential but may be supplied in purified form or in such a crude form as air. Room temperature in the open air are satisfactory reaction conditions and are much preferred to use of an oxygen atmosphere and quantitative gas absorption apparatus. Yields are as high as 96.2% when the reaction is conducted in the preferred manner. After completion of the reaction, the product may be concentrated, washed with solvent, e.g., diethyl ether, and dilute acid, and separated from lead precipitates. The solvent layer may then be washed, dried, clarified with filter aid, and evaporated to yield the desired tetrahydrohumulone (III).

As an additional feature of this invention, alternative to being introduced into Step 3 of the process, when the preceding Steps 1 and 2 are conducted upon the modified NVNI fraction (i.e., the tar-free aqueous filtrate obtained by stirring with water, at a pH of at least 9, the hop extract fraction which is nonvolatile nonisomerizable in hot basic aqueous medium at pH of 10–11), as exemplified by Example 5 hereof, thereby converting same to a hydrogenolyzed, oxidized modified NVNI fraction rich in tetrahydrohumulone, this product (the hydrogenolyzed, oxidized modified NVNI fraction) can be used directly or after dilution in the flavoring of beverages (see Example 6), especially malt beverages, into which it is preferably introduced during the wort boil, wherein the natural acidic pH of the beer, usually about pH 4–6, and the boiling effects isomerization to the desirable hop flavor tetrahydroisohumulone (IV). The beer or other beverage thus flavored has an invigorating highly-palatable taste and is stable and not subject to deterioration or production of skunky odors upon storage or long standing.

(III→IV)

Step 3 of the process involves isomerization of tetrahydrohumulone to tetrahydroisohumulone. The isomerization may be carried out at any pH value within the range of 6 to 12, but the optimum pH range is about 10–11. Any reagent producing the desired pH range may be employed. Trisodium phosphate is particularly suitable. The solvent for the reaction is not critical. Any water-miscible solvent in which the starting material (and preferably also the reaction product) is soluble may be employed. Lower alkanols, e.g., ethanol, are especially suitable as solvents. Water-immiscible solvents may also be used as cosolvent for temperature control, i.e., to prevent the temperature from exceeding the boiling point of the water-immiscible solvent. Among the suitable water-immiscible solvents, hexane and heptane deserve special mention. The temperature of the isomerization is, however, not critical. Temperatures in the neighborhood of 95° C., as can be readily attained by means of an oil bath, are entirely suitable. Lower temperatures simply require a longer period of heating and higher temperatures a shorter period of heating. The preferred temperature is at or about the reflux temperature of the particular solvent employed. Lower pH ranges require a longer reflux period and higher pH ranges require a shorter reflux period, the temperature being constant. After reaction, the pH may be lowered, the product filtered using diatomaceous earth filter aid, and the filtrate extracted with organic solvent, e.g., petroleum ether, dried, and evaporated to yield the desired tetrahydroisohumulone (IV). Extraction of the aqueous layer from the petroleum ether extraction with diethyl ether after acidification provides additional tetrahydroisohumulone product. The tetrahydroisohumulone may be used as such for flavoring of malt or other palatable beverages by incorporation therein, as indicated in Example 7 hereof, or it may be incorporated into a beverage by production in situ in a beverage by the incorporation of tetrahydrohumulone into the beverage and isomerizing it to the iso form, as by heating, under the conditions naturally present in the beverage, most advantageously under conditions which are basic with respect to the tetrahydrohumulone, for example, the mildly acidic conditions which exist in a malt beverage such as beer or ale, as previously indicated and as further illustrated by Example 6.

(IV→V)

Step 4 in the process involves reduction of the C–4 side chain carbonyl group of tetrahydroisohumulone (IV) to a hydroxy group, thereby to produce hexahydroisohumulone (V). A borohydride, preferably a metal, e.g., alkali metal, e.g., sodium or potassium, borohydride, diborane, aluminum isopropoxide, or other suitable reducing agents may be employed. The reaction is preferably conducted with agitation or stirring. Various solvents such as water, alcohols, amines, and glycol ethers may be employed. Water and lower-alkanols, e.g., ethanol, are preferred solvents. The reduction can be carried out over fairly wide pH and temperature ranges, but mildly alkaline conditions and moderate temperatures are preferred. The pH is usually 7–12, preferably 10–11. Room temperature or above is usually satisfactory. The concentration of reducing agent can be varied widely within reasonable limits. After the reduction, the pH may be lowered to decompose excess borohydride, as with hydrochloric acid, and the product recovered by extraction with a water-immiscible solvent such as methylene chloride. Other acids may be used to reduce pH and destroy excess borohydride, and other solvents, e.g., petroleum ether, ethers, hydrocarbons, and other chlorinated hydrocarbons, may be used for product recovery. After being dried, the solvent is usually evaporated to leave the pure product hexahydroisohumulone (V) behind as a pale yellow gum.

This novel product was found to be completely stable and light stable and to be a valuable flavoring agent for beverages, especially malt beverages such as beer and ale, being completely light stable when dissolved or dispersed therein (preferably after fermentation and boiling or cooking of the wort), the thus-flavored beverage being completely skunk-proof even upon storage or long standing.

The following examples are given by way of illustration only and are not to be construed as limiting.

EXAMPLE 1

Synthesis of 4-deoxytetrahydrohumulone from lupulone (I→II)

To a solution of 1.81 g. (4.37 mmoles based on an arbitrary molecular formula of $C_{26}H_{38}O_4$) of pale yellow, crystalline lupulone in 21 ml. of methanol were added 362 mg. of 5% palladium on carbon and 1.9 ml. of concentrated hydrochloric acid. The pH was below 1. Upon hydrogenation this mixture absorbed 414 ml. (95% of the theoretical volume) of hydrogen in 30 minutes at 23.5° C. and 742 mm. The catalyst was rinsed with fresh methanol and, after concentration of the combined methanol fractions to ca. 20 ml. (rotary evaporator; 40–50°), the solution was partitioned between 75 ml. each of ether and water. The ether layer was washed with water and brine and then dried over anhydrous sodium sulfate and evaporated to furnish 1.52 g. (quantitative yield) of 4-deoxytetrahydrohumulone as a clear, pale yellow oil with $\lambda_{max}$ at 224, 338, and 353 m$\mu$ and $\lambda_{min}$ at 270 m$\mu$ in 0.003 N sodium hydroxide in methanol.

EXAMPLE 2

Synthesis of tetrahydrohumulone from 4-deoxytetrahydrohumulone (II→III)

Lead (II) acetate trihydrate (1.59 g., 4.19 mmoles) dissolved in 21 ml. of methanol was added to a solution of 1.52 g. (4.34 mmoles) of 4-deoxytetrahydrohumulone in 84 ml. of methanol, and the resulting yellow solution was stirred rapidly in a beaker at room temperature for one hour and then concentrated on a warm water bath under reduced pressure to ca. 50 ml. The concentrate was shaken with a mixture of 100 ml. each of ether and 1% aqueous hydrochloric acid whereupon precipitated lead chloride settled in the aqueous layer and was drawn off. The ether layer was washed with water and brine, dried over anhydrous sodium sulfate, clarified with Celite (diatomaceous earth) filter aid, and evaporated to furnish 1.53 g. (96.2% yield) of tetrahydrohumulone as a viscous, amber oil with $\lambda_{max}$ 332 m$\mu$, shoulder at 354 m$\mu$, and $\lambda_{min}$ 273 m$\mu$ in 0.003 N sodium hydroxide in methanol.

EXAMPLE 3

Synthesis of tetrahydroisohumulone from tetrahydrohumulone (III→IV)

A solution of 670 mg. (1.84 mmoles) of tetrahydrohumulone in 7 ml. of ethanol was neutralized by the addition of 2 ml. of 1 N aqueous sodium hydroxide. To the resulting magenta solution was added 60 ml. of 2% aqueous trisodium phosphate dodecahydrate. After the pH of the resulting orange, milky suspension was lowered to 10.1, the temperature of the stirred mixture was raised (oil bath) to 96° over a period of 20 minutes, and the mixture was refluxed for one hour and then cooled to room temperature. The pH was lowered to 6.1, the dark, gummy, suspended material was removed with Celite diatomaceous earth filter aid, and the clear, pale yellow filtrate was divided into two equal portions, (a) and (b).

(a) The pH of one portion was lowered to 1.6, and the white, milky precipitate was extracted with low-boiling petroleum ether. The petroleum ether layer was dried over anhydrous sodium sulfate and evaporated to give tetrahydroisohumulone as a pale yellow gum; $\lambda_{max}$ 256 m$\mu$ ($\alpha$=54.4), $\lambda_{min}$ 215 m$\mu$ ($\alpha$=10.7) in 0.003 N sodium hydroxide in methanol. The aqueous layer from the petroleum ether extraction was strongly acidified and then extracted with ethyl ether. This furnished an additional 55 mg. (16%) of tetrahydroisohumulone, which was identical with that obtained above. This compound is a relatively stable, extremely bitter material, having a characteristic non-skunky odor, even upon aging, and is useful in the direct flavoring of malt and other palatable beverages.

EXAMPLE 4

Synthesis of hexahydroisohumulone from tetrahydroisohumulone (IV→V)

(b) The pH of the second half of the purified reaction mixture from the preceding Example 5 was adjusted to 11.1, and the new carbonyl function was reduced. After the addition of 99 mg. (1.84 mmoles) of potassium borohydride, the clear, light yellow solution was stirred slowly at room temperature for four hours, and then the pH was lowered to 6.0 and the clear solution was allowed to stand overnight. Methylene chloride was added, and the pH of the stirred mixture was lowered to 1.7. The organic phase was dried over anhydrous sodium sulfate and then evaporated to leave hexahydroisohumulone as a pale yellow gum; $\lambda_{max}$ 255 ($\alpha$=42.1), 269 (44.2), and $\lambda_{min}$ 221 m$\mu$ (8.4).

The product hexahydroisohumulone was added to beer and ale in concentrations of 10, 20 and 30 p.p.m. either alone or in the form of a 1–5% by weight propylene glycol aqueous suspension thereof after fermentation and boiling at the wort. The resulting flavored beverage in every case had excellent hop taste characteristics and was completely light stable and non-skunky even after long periods of standing and light exposure.

Preparation A

Representative example of a hop extraction process involving removal of volatile hop oils, followed by isomerization and isolation of the nonvolatile-nonisomerizable (NVNI) fraction:

(A) Fresh hops (1000 g.) were dried, ground, and exhaustively extracted with hexane. Removal of the solvent by distillation provided a concentrated micella, which was steam-distilled to provide a hop oil fraction.

(B) Water was added to the residue from the steam distillation in A to bring the total volume to ca. 2 liters. The pH was adjusted to 10–11 with a phosphate buffer and the solution was kept at a temperature between 89 and 97° C. for 30–90 minutes and then poured into sufficient cold 5% hydrochloric acid to lower the pH to 6.4. The precipitated nonvolatile, nonisomerizable (NVNI) fraction was isolated by extraction with hexane and then removal of the solvent by distillation. Comments follow:

(A)

(1) Hops do not have to be fresh, dried, or ground.
(2) Prior art shows solvent can also be most organic solvents, e.g., ethanol, halogenated hydrocarbons, other hydrocarbons, e.g., heptane, benzene, ether, acetone, methanol.

(B)

(1) pH not limited to 10–11. May be pH of 9–13.
(2) Phosphate not limiting. Use any base: NaOH, $NaHCO_3$, $Na_2CO_3$, etc.
(3) Temperature and time not limiting. Lower temperature means longer reaction period. Higher temperature, shorter period.
(4) May be acidified with any water-soluble acid, e.g., $H_2SO_4$.
(5) pH of 6.4 is not limiting. May be 3–9 depending on what solvent is used. Hexane is not limiting. Solvent is limited of course to a water-immiscible solvent.

EXAMPLE 5

Crude lupulone as starting material

Crude lupulone was obtained by filtering the tar-free aqueous solution obtained by stirring with water at pH of at least 9 the fraction of hop extract which is non-volatile and non-isomerizable in hot basic aqueous medium at pH 10–11. It was assayed in alkaline methanol and, assuming $\alpha_{356}$ m$\mu$=46.7 for crystalline lupulone, was found to be about 74% lupulone. A 2.99 gram sample of crude lupulone (this contains 2.20 grams of lupulone, which is 5.32 mmoles based on an approximate molecular weight of 415) was dissolved in 33 ml. of methanol. After the addition of 0.6 gram of 5% palladium on charcoal catalyst and 3 ml. of concentrated hydrochloric acid, the stirred mixture was hydrogenated at room temperature and atmospheric pressure until hydrogen uptake ceased (2 hours, 103% of the theoretical uptake). The catalyst was removed by filtration and washed with fresh methanol. After concentration of the combined methanol fractions (40–50°, water aspirator) to 30 ml., the solution was poured into water and ether. The ether layer was washed with water, dried with brine and anhydrous sodium sulfate, and then evaporated to leave 2.62 g. (96%) of crude 4-deoxytetrahydrohumulone (II) as an amber gum. [$\lambda_{max}$ 224, 338; 352 (sh.) m$\mu$.]

A solution of this gum and of 2.85 g. of lead (II) acetate trihydrate in 176 ml. of methanol was stirred rapidly in an open beaker at room temperature for one hour and then concentrated at 40–50° (rotary evaporator) to ca. 50 ml. The solution was added to 1% hydrochloric acid and methylene chloride, and the emulsified methylene chloride layer was clarified by filtration, dried, and evaporated to leave 2.42 g. of crude tetrahydrohumulone (III) as an amber gum.

The amber gum was dissolved in 2.4 ml. of ethanol, neutralized by the addition of 7.2 ml. of 1 N sodium hydroxide solution, and then diluted with 240 ml. of 2% aqueous trisodium phosphate dodecahydrate. The pH of the resulting suspension was lowered to 10.1, and the mixture was heated at 95–100° for one hour. The pH of the cooled solution was adjusted to 6.1, and the oily suspension was clarified with Celite (diatomaceous earth) filter aid to leave a clear aqueous layer from which tetrahydroisohumulone (IV) was isolated by acidification and extraction with methylene chloride as a clear, amber gum; $\lambda_{max}$ 253, shoulder 267, and $\lambda_{min}$ 218 m$\mu$.

When this product (IV) was treated in accord with the procedure of Example 4, hexahydroisohumulone (V) was produced.

EXAMPLE 6

Flavoring beverage with hydrogenolyzed, oxidized NVNI hop extract fraction

The product of the lead (II) acetate oxidation step of the preceding Example 5, rich in tetrahydrohumulone, was introduced into a beer during the wort boil stage and boiling continued for a time after addition thereof. Under the natural pH conditions of the beer, ca. pH 4–6, the hydrogenolyzed oxidized NVNI fraction isomerized in the beer to produce the characteristic hop flavor of tetrahydroisohumulone. The beer was completely palatable and had a rich deep color and invigorating flavor. The beer was stable under normal storage conditions and, after long standing, had not developed an off-taste.

EXAMPLE 7

Light sensitivity of hop flavor products

To test further the stability of hexahydroisohumulone and other hop flavors, the following test procedure was devised and employed in testing various hop flavor products as indicated.

Reagents (a) Cysteine solution.—Prepared by dissolving one part of cysteine or cysteine hydrochloride in 10,000 parts of deionized water.
(b) Isohumulone solution.—Prepared by dissolving one part of isohumulone in 100 parts of ethanol and then adding the resulting solution dropwise to 9,900 parts of stirred deionized water.
(c) Hop product solution.—Prepared as was reagent (b) with the material under consideration substituted for isohumulone.

Apparatus (a) Long wavelength ultraviolet light tube.
(b) Clear, flint glass, 12-ounce bottles. For example, standard clear beer bottles with the lowest label removed.
(c) Carbon dioxide gas cylinder.
(d) 250-ml. beakers.

Method

To three cleaned bottles [apparatus (b)] fitted with short stemmed funnels add 10 ml. of cysteine reagent (a). To bottle I, the blank control, add 90 ml. of deionized water. Add 80 ml. of deionized water to the other two bottles. To bottle II, the light-struck (skunk) flavor control, add 10 ml. of isohumulone reagent (b). To bottle III, the test solution, add 10 ml. of reagent (c). Wash down each funnel with a little deionized water, purge each solution with carbon dioxide for two minutes, and cork each bottle firmly. Place each bottle as close as possible to the light tube [apparatus (a)] with the tube and its reflector arranged so that the maximum amount of light strikes the solution at right angles to the bottle edge.

After 1½ hours of irradiation pour the solutions into separate 250-ml. beakers and compare the odor of the test solution with that of the blank control and the light-struck control. The odor comparisons must be made within fifteen minutes after the solutions are poured into the beakers.

Light sensitivity results

The following almost unanimous results were obtained from a panel of six adults previously determined to be able to detect "light-struck" or "skunky" odors of sun-struck beer.

Cysteine blank control: a faint characteristic, not unpleasant odor.

Isohumulone (VI below) light-struck control: a strong, objectionable odor reminiscent of skunk. Unstable.

Dihydroisohumulone (VII below): a very faint, occasionally slightly sweet, unobjectionable odor. Relatively stable.

Tetrahydroisohumulone (IV): a characteristic non-skunky odor. Relatively stable.

Hexahydroisohumulone (V): a very faint, slightly sweet, unobjectionable odor. Preferable to all others, completely stable.

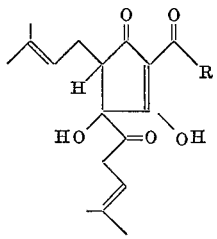
VI. isohumulone

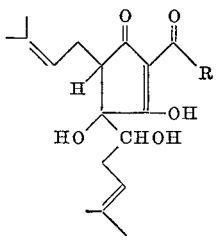
VII. dihydroisohumulone (R is as defined in the foregoing for Formulas I–V)

The flavoring materials of the present invention, especially when in pure or substantially pure form, find application not only in the flavoring of fermented beverages, such as malt beverages, e.g., beer or ale, but also in the flavoring of nonfermented and nonmalt beverages, for example imitation malt beverages, e.g., "near-beer," "root-beer," or any other beverage in which a hop or hop-like flavor is desired, either alone or in combination with other flavor ingredients.

Various modifications and equivalents will be apparent to one skilled in the art and may be made in the compounds, compositions, methods, and procedures of the present invention without departing from the spirit or scope thereof.

We claim:
1. Hexahydroisohumulone.
2. A beverage flavored with hexahydroisohumulone.
3. The method of flavoring a beverage which comprises adding to said beverage an amount of hexahydroisohumulone sufficient to impart the desired degree of bitterness.
4. The method of claim 3, wherein the beverage is a malt beverage and wherein the hexahydroisohumulone is added thereto after fermentation.
5. A process for producing hexahydroisohumulone from lupulone which comprises the steps of dissolving lupulone in solvent and adjusting the pH downwardly by acid addition, hydrogenolyzing the dissolved lupulone with hydrogen in the presence of a hydrogenation catalyst at an acidic pH to produce 4-deoxytetrahydrohumulone, and oxygenating the thus-produced 4-deoxytetrahydrohumulone with an oxygen-containing gas in the presence of lead (II) acetate to produce tetrahydrohumulone, including the further steps of isomerizing tetrahydrohumulone to tetrahydroisohumulone at an elevated temperature and a pH between about 6 and 12, and then reducing the tetrahydroisohumulone to hexahydroisohumulone with an alkali metal borohydride in a solvent at an alkaline pH.
6. The process of claim 5, wherein the starting material is that portion of the non-volatile non-isomerizable hop extract fraction which dissolves in water at a pH of at least 9.
7. The process of claim 5, wherein the hydrogenolysis of lupulone is with hydrogen in the presence of a hydrogenation catalyst comprising palladium on carbon at a pH not greater than about 1.
8. The process of claim 7, wherein the hydrogenolysis of lupulone is conducted in the presence of an alcoholic or ether solvent.

References Cited

UNITED STATES PATENTS 3,044,879  7/1962  Koch et al. _____ 99—50.5

OTHER REFERENCES

Brown et al.: J. Chem. Soc., pp. 545–551, 1959.
Anteunis et al.: Bull- Soc. Chim. Belg., 68, pp. 476–583, 1959.

LIONEL M. SHAPIRO, Primary Examiner

U.S. Cl. X.R.

260—586; 99—31

UNITED STATES PATENT OFFICE
CERTIFICATE OF CORRECTION

Patent No. 3,552,975                     Dated January 5, 1970

Inventor(s) LEONARD R. WORDEN and PAUL H. TODD, JR.

It is certified that error appears in the above-identified patent and that said Letters Patent are hereby corrected as shown below:

Col. 1, line 61                    "luplone" should read
Appl. page 2, line 7                  -- lupulone --

Col. 2, following line 19          words were omitted. Should
and before line 20                    -- Reaction Sequence --
Appl. page 3, at top Col. 2, line 52
Appl. page 3 -
last part of structural formula    should read:

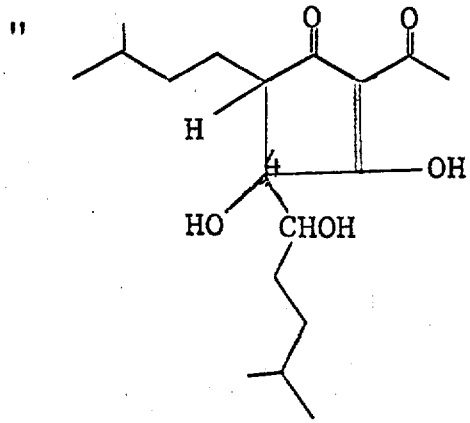 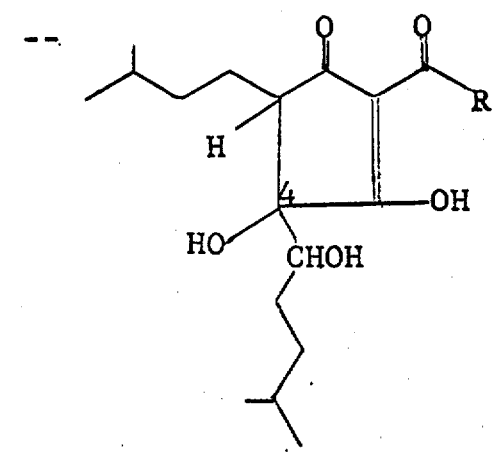

V. hexahydroisohumulone"           V. hexahydroisohumulone --

Col. 6, line 59                    "at" should read
Appl. page 11, line 22                -- of --

Signed and sealed this 10th day of August 1971.

(SEAL)
Attest:

EDWARD M. FLETCHER, JR.            WILLIAM E. SCHUYLER, JR.
Attesting Officer                  Commissioner of Patents